United States Patent
Krachkovsky et al.

(10) Patent No.: US 7,734,993 B2
(45) Date of Patent: *Jun. 8, 2010

(54) METHOD AND APPARATUS FOR ENCODING AND PRECODING DIGITAL DATA WITHIN MODULATION CODE CONSTRAINTS

(75) Inventors: Victor Krachkovsky, Allentown, PA (US); Xiaotong Lin, Bethlehem, PA (US)

(73) Assignee: Agere Systems Inc., Allentown, PA (US)

( * ) Notice: Subject to any disclaimer, the term of this patent is extended or adjusted under 35 U.S.C. 154(b) by 125 days.

This patent is subject to a terminal disclaimer.

(21) Appl. No.: 12/103,860

(22) Filed: Apr. 16, 2008

(65) Prior Publication Data
US 2008/0195921 A1 Aug. 14, 2008

Related U.S. Application Data

(63) Continuation of application No. 11/050,208, filed on Feb. 3, 2005, now Pat. No. 7,386,780.

(51) Int. Cl.
G06F 11/00 (2006.01)
H03M 13/00 (2006.01)

(52) U.S. Cl. ...................... 714/801; 714/770

(58) Field of Classification Search ................ 714/784, 714/801, 770
See application file for complete search history.

(56) References Cited

U.S. PATENT DOCUMENTS

| | | | |
|---|---|---|---|
| 5,396,519 A * | 3/1995 | Betts et al. ................. | 375/296 |
| 6,604,220 B1 * | 8/2003 | Lee ............................ | 714/769 |
| 6,968,430 B1 * | 11/2005 | Kashyap ..................... | 711/137 |
| 7,030,789 B1 * | 4/2006 | Cideciyan et al. ............ | 341/83 |
| 7,071,851 B1 * | 7/2006 | Blaum et al. ................. | 341/59 |
| 7,196,999 B2 * | 3/2007 | Hattori et al. .............. | 369/59.22 |
| 7,200,180 B2 * | 4/2007 | Verbin et al. ................. | 375/261 |
| 7,219,295 B2 * | 5/2007 | Yamada ..................... | 714/758 |
| 2001/0052098 A1 * | 12/2001 | Miyauchi et al. ............ | 714/746 |
| 2002/0057640 A1 * | 5/2002 | Hattori et al. .............. | 369/59.24 |
| 2004/0181732 A1 * | 9/2004 | McEwen et al. ............ | 714/755 |
| 2004/0237020 A1 * | 11/2004 | Eiji ........................... | 714/758 |
| 2005/0138518 A1 * | 6/2005 | Cideciyan et al. .......... | 714/752 |

\* cited by examiner

*Primary Examiner*—M. Mujtaba K Chaudry

(57) ABSTRACT

Embodiments of the invention include a method and apparatus for encoding data and a system for transmitting and/or storing data, in which the data is encoded and precoded in a manner that does not violate previously established data constraints, such as modulation encoding constraints. The method includes the steps of modulation encoding the data using a modulation code defined by at least one modulation constraint, parity encoding the modulation encoded information, and precoding the encoded information. The precoding step either partially precodes information bits and precodes parity bits, precodes information bits but not parity bits, or precodes both information bits and parity bits in such a manner that does not violate modulation constraints. Also, the parity encoding step can be performed in such a manner that does not violate modulation code constraints.

26 Claims, 4 Drawing Sheets

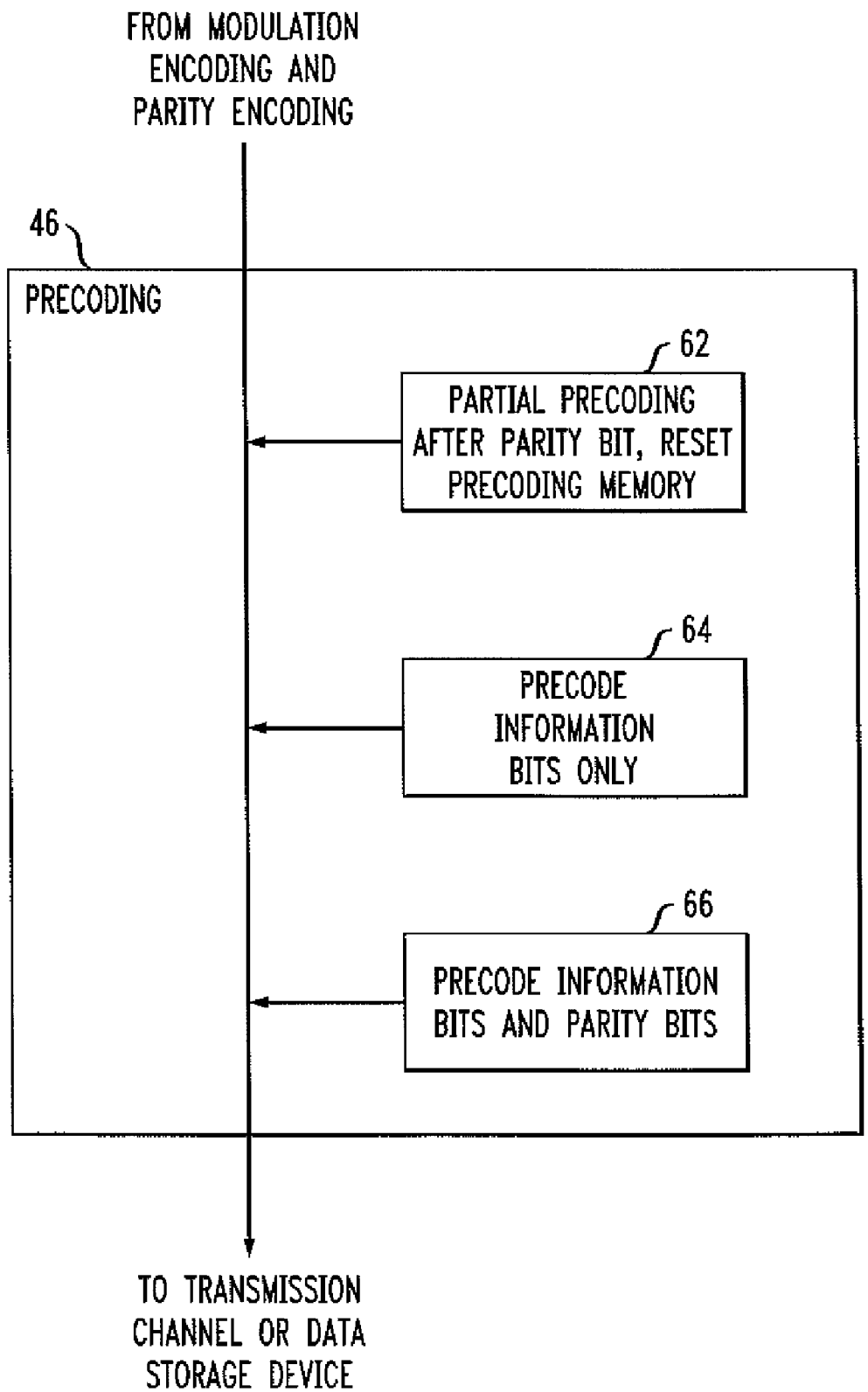

METHOD AND APPARATUS FOR ENCODING AND PRECODING DIGITAL DATA WITHIN MODULATION CODE CONSTRAINTS

BACKGROUND OF THE INVENTION

1. Field of the Invention

The invention relates to digital information transmission and/or storage methods and systems. More particularly, the invention relates to methods and apparatus for encoding, preceding and decoding digital information transmitted and/or stored within such systems.

2. Description of the Related Art

Data encoding systems and methods add redundancy and/or parity bits to streams of digital data to be transmitted and/or stored to reduce the data's susceptibility to corruption. Data corruption typically occurs in the form of interference, such as intersymbol interference, and/or noise, such as channel noise. Applying error correction coding to data prior to its transmission or storage allows a receiver or data read device to detect and sometimes correct errors introduced into the data by interference and/or noise. In this manner, data encoding systems and methods can reduce or eliminate the need to retransmit or rewrite corrupted data, or to identify data loss if rewriting is not possible. Some types of error correction coding schemes include convolutional coding, block coding, and Reed-Solomon coding.

An important development in the area of soft decoding was the discovery of turbo codes. Turbo codes typically involve an iteratively decodable combination of two or more systematic convolutional or block codes (i.e., convolutional or block codes where the output bits of the encoder include unaltered input bits.) This iterative approach later was applied to a particular class of block codes called Product Codes, resulting in Turbo Product Coding (TPC).

The use of turbo codes often helps to approach channel capacity. Also, another reason for the appeal of turbo codes is the ability to implement turbo codes in integrated circuits with advanced technology process. This feature typically frees system designers of concerns about many issues regarding the internal operation of the turbo coder or decoder.

A conventional coding arrangement includes one or more encoders, such as a modulator or modulation encoder, and/or an ECC encoder (e.g., a Reed-Solomon encoder), and/or a parity encoder (e.g., a TPC encoder), and/or a precoder. The modulation encoder transforms data into codewords according to a given constraint. The modulation encoder constrains the data stream to improve the performance of the channel synchronization and detection.

The ECC encoder typically encodes data to protect it from different channel distortions including random noise and error bursts. For this purpose, the ECC encoder calculates the ECC parity of the codeword and inserts one or more ECC parity symbols into codeword. Thus, the ECC encoder makes codewords distinct enough from one another even in the presence of a certain amount of channel noise. An example of an ECC encoder is a Reed-Solomon encoder. The parity encoder typically calculates the parity of a codeword and inserts one or more parity bits into the codeword. One conventional type of parity encoder is a TPC encoder. The ECC encoder targets to improve frame/symbol error rate, while the parity encoder is designed to improve bit error rate.

The precoder works to improve the performance of any of the above-mentioned error-correction schemes by using one or more transfer functions or other conventional data manipulation techniques. One conventional precoder can be defined by the transfer function $1/(1+D)$, where D stands for unit delay. Other conventional precoders include, but are not limited to, the precoder defined by the transfer function $1/(1+D^2)$ and/or the precoder defined by the transfer function $1/(1+D^3)$.

When used with the $1/(1+D)$ precoder, the output from the modulation encoder presents a data stream having a non-return-to-zero inverse (NRZI) waveform shape. That is, the encoder output is in NRZI notation, which means that a "1" designates the recording of a transition and a "0" represents the lack of a transition. In this situation, the $1/(1+D)$ precoder converts an NRZI data stream into a data stream in non-return-to-zero (NRZ) notation, where a "1" represents a logical high level and a "0" represents a logical low level. In a more general sense, any precoder converts an unprecoded data stream into a channel NRZ data stream.

One concern with many conventional data encoding schemes is that the insertion of parity bits by the parity encoder may violate constraints on the data established by the modulation encoder, especially if the encoded data subsequently pass through a precoder. However, as mentioned previously, precoders are useful for performance improvement.

Accordingly, it would be desirable to have a data encoding method, apparatus and system that provides parity encoding and precoding without violating modulation code constraints.

SUMMARY OF THE INVENTION

The invention is embodied in a method and apparatus for encoding digital data in which precoding does not violate previously established data constraints, such as modulation encoding constraints. The method includes the steps of modulation encoding the data using a modulation code defined by at least one modulation constraint, parity encoding the modulation encoded information, and precoding the encoded information in such a way that does not violate the data constraints.

BRIEF DESCRIPTION OF THE DRAWINGS

FIG. 3 is a simplified diagram of the preceding step of the encoding method, according to embodiments of the invention;

DETAILED DESCRIPTION OF EXEMPLARY EMBODIMENTS

Figure 1:
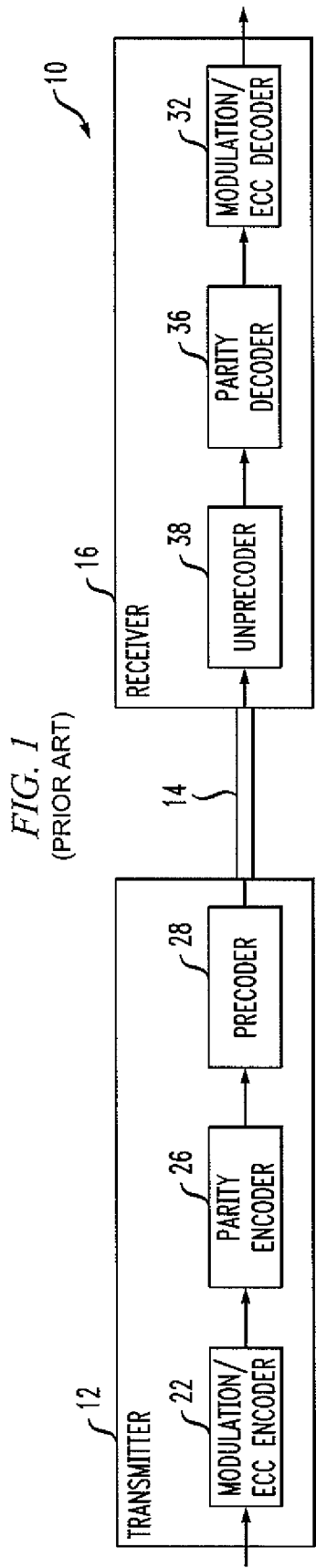
FIG. 1 is a simplified schematic diagram of an information transmission and/or storage system.

In the following description, like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Referring now to FIG. 1, shown is a simplified schematic diagram of an information transmission and/or storage system 10. Information to be transmitted or stored is input to a transmitter 12, which transmits the information across a transmission or recording channel 14 to a receiver 16. In data storage systems, the transmission channel 14 is a data storage device, such as a hard disk drive (HDD) or optical disk drive, the transmitter 12 is a data write device that writes data to the data storage device, and the receiver 16 is a data read device that reads data stored in the data storage device. As will be more clear from further discussion hereinbelow, the transmitter 12 typically is an encoding apparatus or device that includes one or more encoders. Similarly, the receiver 16 is a decoding apparatus or device that includes decoders that correspond to the encoders in the transmitter 12.

The transmitter 12 is comprised of any suitable structure or arrangement, e.g., one or more integrated circuits. Similarly, the receiver 16 is comprised of any suitable structure or arrangement, e.g., one or more integrated circuits. The transmission channel 14 is any suitable transmission medium, e.g., one or more optical fibers, electrically conducting wires, or one or more conductive tracts on one or more integrated circuits. Alternatively, the information transmission system 10 is a wireless system comprising a wireless transmitter and a wireless receiver. In data storage systems, the transmitter (data write device) and the receiver (data read device) often are part of the same integrated circuit.

In the system 10, data entering the transmitter 12 passes through one or more encoders, e.g., modulation/error correction coding (ECC) encoder 22, a parity encoder 26, and/or a precoder 28. Arrangement of ECC and modulation encoder can typically be done in two different ways, referred to as direct and reverse ECC encoding arrangements. In direct ECC encoding arrangement, the modulation encoder follows the ECC encoder. In reverse ECC encoding arrangement, an ECC encoder typically follows a modulation encoder. Also, a second modulation encoder typically is used to encode additional information generated by the ECC encoder, e.g., ECC check symbols.

Encoded data received or read from the channel 14 is decoded by one or more decoders in the receiver 16, which decoders correspond to the encoders in the transmitter 12, but in reverse order. That is, for a transmitter 12 that includes the modulation/ECC encoder 22, the parity encoder 26, and the precoder 28, the receiver 16 includes an unprecoder 38, a parity decoder 36, and a modulation/ECC decoder 32.

Figure 2B:
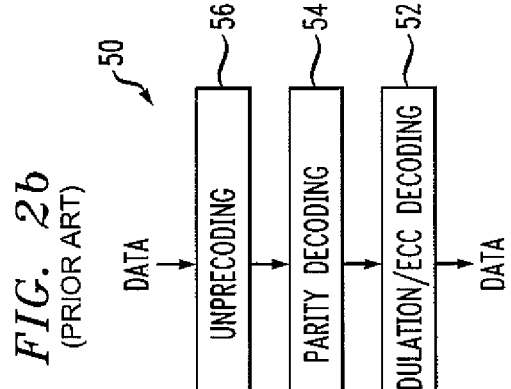
FIG. 2b is a simplified block diagram of a method for decoding information that has been encoded according to embodiments of the invention.
Figure 2A:
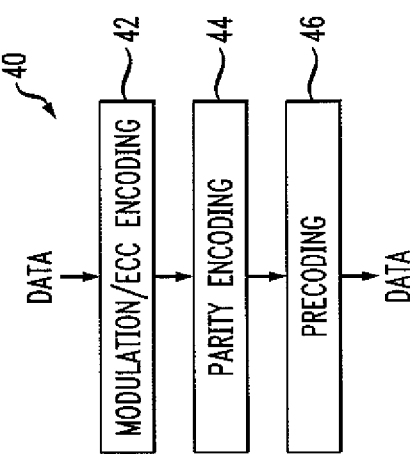
FIG. 2a is a simplified block diagram of a method for encoding information according to embodiments of the invention.

Referring now to FIGS. 2a and 2b, shown are simplified block diagrams of a method 40 for encoding information according to embodiments of the invention (FIG. 2a) and a method 50 for decoding information that has been encoded according to embodiments of the invention. The encoding and decoding methods shown in the figures generally correspond to the one or more of the components in the transmitter 12 and receiver 16 shown in FIG. 1, and initially described hereinabove.

As shown in FIG. 2a, the encoding method 40 includes the step 42 of modulation/ECC encoding, the step 44 of parity encoding, and the step 46 of precoding. The modulation/ECC encoding step 42 is performed by one or more modulation encoders and/or an ECC encoder, e.g., the modulation/ECC encoder 22 shown in the transmitter 12 in the system in FIG. 1. The parity encoding step 44 is performed by any suitable parity encoder, e.g., the parity encoder 26 shown in the transmitter 12 in the system in FIG. 1. The precoding step 46 is performed by any suitable precoder, e.g., the precoder 28 shown in the transmitter 12 in the system in FIG. 1.

In the decoding method 50 shown in FIG. 2b, steps include the step 56 of unprecoding, the step 54 of parity decoding, and the step 52 of modulation/ECC decoding. The unprecoding step 56 is performed by any suitable unprecoder, e.g., the unprecoder 38 shown in the receiver 16 in the system 10 in FIG. 1. Similarly, the parity decoding step 54 is performed by any suitable parity decoder, e.g., the parity decoder 36 shown in the receiver 16 in the system 10 in FIG. 1. Also, the modulation/ECC decoding step 52 is performed by one or more modulation decoders and/or an ECC decoder, e.g., the modulation/ECC decoder 32 shown in the receiver 16 in the system 10 in FIG. 1.

According to embodiments of the invention, one or more of the components comprising the transmitter 12 is comprised of any suitable structure or arrangement, e.g., one or more integrated circuits. That is, one or more of the modulation/ECC encoder, the parity encoder and the precoder is an integrated circuit. Alternatively, more than one of the components that comprises the transmitter 12 is an integrated circuit. Similarly, one or more of the components comprising the receiver 16 is comprised of any suitable structure or arrangement, e.g., one or more integrated circuits. That is, one or more of the unprecoder, the parity decoder, and the modulation/ECC decoder is an integrated circuit. Alternatively, more than one of the components that comprises the receiver 16 is an integrated circuit.

As discussed previously herein, modulation encoding of data is performed according to a given constraint, hopefully in a manner that helps to maintain timing between the transmission and receiving sides of the system. For example, in the transmitter 12 in the system 10 shown in FIG. 1, one of the modulation encoders maps a group of n bits into a group of n+1 bits, which mapping enables the imposed modulation constraints as the data is transmitted through the system 10.

One conventional type of modulation constraint is a run-length-limited (RLL) constraint. The RLL constraint limits a maximum (and sometimes a minimum) number of data bits between any two consecutive transitions in the data stream of interest.

Another conventional type of modulation constraint is a spectral constraint, such as a constraint on maximum amount of Direct Current (DC) in a given data stream of interest, or DC constraint. The DC constraint limits the total number of "0" NRZ bits and the total number of "1" NRZ bits in a given data stream of interest. The presence of too many "0" or too many "1" bits within a given number of NRZ bits in the data stream can boost the noise at DC in perpendicular recording channels. That is, having too many of one kind of data bit within a given number of data bits can introduce more DC noise, which degrades system performance.

The parity encoder 26 typically reads the data codewords, determines the parity of the codewords, and adds one or more parity bits to the codewords, depending on the parity of the codeword that is read. One type of parity encoder is a turbo product code (TPC) encoder.

The precoder 28 improves error event spectrum in favor of system performance. In one conventional preceding technique, the precoder 28 produces a logical 0 output when the sum of two consecutive inputs bits is even and a logical 1 when the sum of two consecutive inputs bits is odd. The initial input bit is summed with the current precoder memory state, which is preset to logical 0 or logical 1, and which is rewritten by the current output bit. This precoding technique is defined by the transfer function 1/(1+D), where the D is commonly known to stand for unit delay. Other conventional precoders of interest include but are not limited to the precoder defined by the transfer function $1/(1+D^2)$ and the precoder defined by the transfer function $1/(1+D^3)$.

As an example, using a precoder defined by the transfer function 1/(1+D), for an input bitstream of 001100101, and the initial state of the precoder memory set to 0, the precoder will produce an output stream of 001000110. More specifically, the sum of the precoder state (initially set to 0) and the first input bit (0) is 0. Therefore, the first output bit is 0 and the precoder memory state remains 0. The sum of the second input bit (0) and the current precoder state (0) is 0, which becomes the second output bit, with the precoder memory state remaining 0. The sum of the third input bit (1) and the current precoder state (0) is 1, which becomes the third output bit, with the precoder memory state changing to 1. The sum of the fourth input bit (1) and the current precoder state (1) is 0, which becomes the fourth output bit, with the precoder memory state changing to 0. Such encoding continues in this manner to produce the output stream of 001000110.

Alternatively, for a precoder memory state initially set to 1, the precoder encodes the same input stream 001100101 as 110111001. As can be seen, this output stream is the exact or complete inverse of the previous precoded output stream. Therefore, as will be noted hereinbelow with respect to embodiments of the invention, the initial state of the precoder memory affects the encoded output stream.

In data storage arrangements, the encoders and decoders typically are used in the read-write channels of a storage device, such as a hard disk drive (HDD). Typically, data from a data source is transmitted to a write channel, where it is encoded prior to being written to the storage device. To retrieve the stored data, the data is read from the storage device to a read channel, where it is decoded by one or more decoding devices. Typically, the encoders and/or the decoders are comprised of one or more integrated circuits and the transmission channel is one or more data buses within the data storage system. Alternatively, in data storage systems, the transmitter (the data write device) and the receiver (the data read device) are part of the same integrated circuit. However, alternatively, encoding and decoding is performed in appropriate hardware or firmware within the transmitter and the receiver portions of the system, or at some other appropriate location within the system.

As discussed hereinabove, the insertion of parity bits by an encoder, e.g., the parity encoder 26, often causes the parity encoded data to violate data constraints established by the one or more modulation encoders. Such violation is true especially if the parity encoded data subsequently is precoded. Also, precoding parity bits may change the polarity of the parity bits, which often will cause the data to violate those previously established data constraints, especially DC constraints. According to embodiments of the invention, a data encoding method, apparatus and system is disclosed in which parity encoding and precoding does not violate previously established data constraints, such as modulation encoding constraints.

According to embodiments of the invention, the preceding step 46 precodes data that has been modulation encoded by the modulation encoding step 42 and parity encoded by the parity encoding step 44 in a manner that satisfies any DC modulation constraint. In general, according to embodiments of the invention, the preceding step 46, upon locating a parity bit, sets or resets the preceding memory to any state that is not affected by the located parity bit. In these embodiments of the invention, the preceding step 46 is performed after the parity encoding step 26.

Referring now to FIG. 3, shown is a simplified diagram of the preceding step 46 of the encoding method 40 shown in FIG. 2a, according to three possible embodiments of the invention. It should be understood that FIG. 3 shows only those portions of the preceding step 46 that relate to three possible embodiments of the invention, to the extent that they differ from conventional portions of the preceding step 46. Such portions are shown generally as steps 62, 64, and 66. Also, it should be understood that the preceding step 46 according to embodiments of the invention includes other conventional portions that are not shown in FIG. 3. Moreover, according to embodiments of the invention, no more than one of the steps 62, 64, and 66 is performed on any given data stream. That is, the three precoding steps 62, 64, and 66 are not used together on the same data stream.

According to one embodiment of the invention, the precoding step performs partial precoding on the modulation encoded and parity encoded data. Such portion of this embodiment of the inventive precoding step is shown generally as step 62. Conventionally, preceding is performed on all data bits, including parity bits added to the data as a result of the parity encoding step. As discussed previously herein, precoding a parity bit that has been added to the encoded data stream may change the polarity of the remaining data stream, which may cause the data stream to violate the DC modulation constraint.

However, according to this embodiment of the invention, the preceding step, upon detection of a parity bit, sets or resets the preceding memory to a state that is not affected by the addition of the parity bit. In this manner, the preceding step effectively does not precode the information data bit that follows the parity bit. Therefore, the repeated possibility of changing the polarity of the remaining data sequence, which could cause the data stream to violate the DC modulation constraint, is eliminated.

Figure 4:
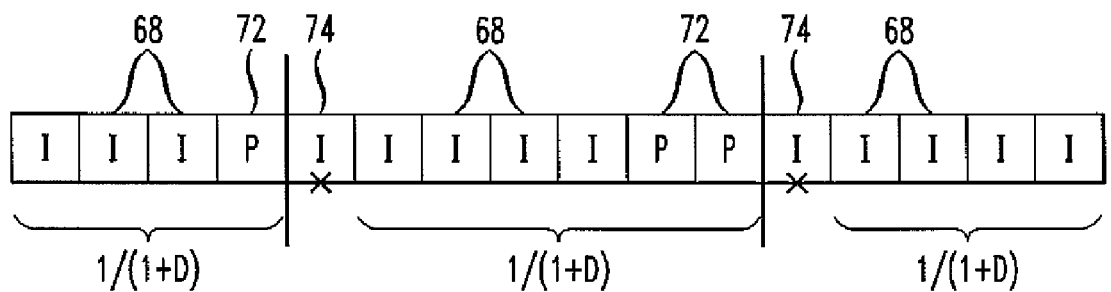
FIG. 4 is a simplified diagram of a sample data stream being precoded according to an embodiment of the invention.

Referring now to FIG. 4, with continuing reference to FIG. 3, shown is a simplified diagram of a sample data stream being precoded according to the partial precoding step shown in step 62. After passing through the parity encoder 26, the encoded data stream includes a plurality of data bits or information bits (I) and one or more parity bits (P) added periodically throughout the data stream. The information bits (I) are shown generally as 68, and the parity bits (P) are shown generally as 72.

As just discussed, the partial precoding step 62 precodes all bits except for the first information bit that occurs after a parity bit has been detected. Thus, in the sample data stream shown in FIG. 4, the precoder precodes the first four bits (3 information bits and 1 parity bit), using the precoding method defined by but not limited to the transfer function 1/(1+D), as shown. Because the fourth bit is detected as a parity bit, the preceding memory is reset (e.g., to 0) or otherwise set so that the remaining data sequence is not affected adversely by the added parity bit. The precoding memory is set at the fifth bit, i.e., the first information bit after the detection of a parity bit. Because the preceding memory is set at the fifth bit (shown as 74), the fifth bit, in effect, is not precoded.

Then, the next sequence of bits is precoded, beginning with bit 6. Because bit 10 is detected as a parity bit, the preceding memory is set or reset at the next information bit, i.e., bit 12 (bit 11 also is a parity bit). Thus, bits 6 through 11 (4 information bits and 2 parity bits) are precoded using the precoding method defined by the transfer function 1/(1+D). Finally, in this example, the remaining bits (bits 13 through 16) also are precoded using the preceding method defined by the transfer function 1/(1+D).

According to another embodiment of the invention, the preceding step precodes information bits, but does not precode parity bits. Such portion of this embodiment of the inventive precoding step is shown generally as step 64. As discussed hereinabove, conventionally, precoding is performed on all data bits, including parity bits added to the data as a result of the parity encoding step. However, in this embodiment, precoding the information bits but not the parity bits eliminates the possibility of preceding changing the polarity of the remaining data sequence, which possibly could cause the data stream to violate the DC modulation constraint.

Figure 5:
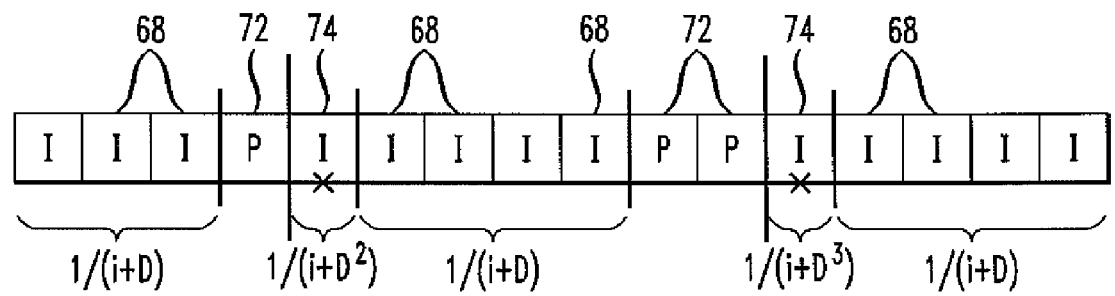
FIG. 5 is a simplified diagram of a sample data stream being precoded according to another embodiment of the invention.

Referring now to FIG. 5, with continuing reference to FIG. 3, shown is a simplified diagram of a sample data stream being precoded according to the embodiment of the invention shown in step 64. After passing through the parity encoder 26, the encoded data stream includes a plurality of data bits or information bits (I) and one or more parity bits (P) added periodically throughout the data stream. As in FIG. 4, the information bits (I) are shown generally as 68, and the parity bits (P) are shown generally as 72.

In this embodiment of the invention, the information bits are precoded and the parity bits are not precoded. Therefore, in the example shown in FIG. 5, the precoder precodes the first three bits, which are information bits, using the preceding method defined by but not limited to the transfer function 1/(1+D). The fourth bit, which is a parity bit, is not precoded. The fifth bit, which is an information bit shown as 74, is precoded using the preceding method defined by but not limited to the transfer function $1/(1+D^N)$, where N is the number of shifts or transitions between the last information bit before the detected parity bit and the first information bit after the detected parity bit. Thus, in this example, the fifth bit is precoded using the preceding method defined by the transfer function $1/(1+D^2)$, since the precoder has to transition or shift two bit places before resuming precoding, i.e., from the third (information) bit to the fifth (information) bit, skipping the fourth (parity) bit.

The next sequence of information bits is precoded, beginning with the next information bit (the sixth bit). Bits 6 through 9, all information bits, are precoded using the precoding method defined by the transfer function 1/(1+D). Parity bits 10 and 11 are not precoded, as per this embodiment. Bit 12 (shown as 74), the next information bit after the parity bits, is precoded using the preceding method defined by the transfer function $1/(1+D^3)$. The preceding method defined by the transfer function $1/(1+D^3)$ is used here because the precoder has to shift three bit places from the previous information bit (bit 9) to the next information bit (bit 12) after the detected parity bit (bit 10). Next, in this example, the remaining information bits (bits 13 through 16) are precoded using the precoding method defined by the transfer function 1/(1+D).

According to yet another embodiment of the invention, the precoding step, shown generally as a step 66 in FIG. 3, somewhat combines features of the two inventive preceding steps 62 and 64 discussed previously herein. More specifically, in the inventive preceding step 66 in this embodiment, both information bits and parity bits are precoded, as in the previous inventive preceding step 62. However, the first information bit that occurs after a parity bit has been detected also is precoded, as in the previous inventive preceding step 64. Still, the precoding step 66 in this embodiment eliminates the possibility of precoding changing the polarity of the remaining data sequence, which possibly could cause the data stream to violate the DC modulation constraint.

Figure 6:
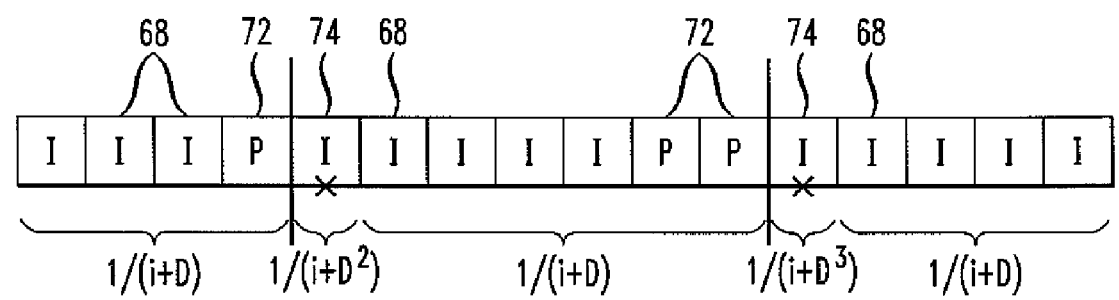
FIG. 6 is a simplified diagram of a sample data stream being precoded according to yet another embodiment of the invention.

Referring now to FIG. 6, with continuing reference to FIG. 3, shown is a simplified diagram of a sample data stream being precoded according to the embodiment of the invention shown in step 66. Again, as in the other embodiments discussed hereinabove, the encoded data stream, which has passed through the parity encoder 26, includes a plurality of information bits 68 and one or more parity bits 72.

In the data example, according to this embodiment of the invention, the precoder precodes both information bits and parity bits. Thus, the first four bits (3 information bits and 1 parity bit) are precoded, using the preceding method defined by but not limited to the transfer function 1/(1+D). The first information bit after the parity bit (bit 5, shown as 74) also is precoded. However, bit 5 is precoded using the preceding method defined by the transfer function $1/(1+D^2)$, as there are two shifts or transitions between the last information bit before the parity bit (bit 3) and the first information bit after the parity bit (bit 5).

Beginning with the next bit (information bit 6), the next sequence of bits is precoded. Because bits 6 through 9 are information bits and bits 10 and 11 are parity bits, the sequence of information bits and parity bits up to the first information bit after the detected parity bit (i.e., bits 6 through 11) are precoded using the precoding method defined by the transfer function 1/(1+D). Bit 12, which is the first information bit after bit 10 (the detected parity bit), is precoded using the preceding method defined by the transfer function $1/(1+D^3)$, as there are three shifts between the last information bit before the parity bit (bit 9) and the first information bit after the parity bit (bit 12). Lastly, the remaining bits in this example, (bits 13 through 16) are precoded using the precoding method defined by the transfer function 1/(1+D).

According to another embodiment of the invention, the parity encoding step 44 encodes data that has been modulation encoded by the modulation encoding step 42 in a manner that minimizes any increase in RLL modulation constraint. For example, in general, for a parity encoder such as a TPC encoder with a structured interleaver, the interleaver parameters are programmed to satisfy the RLL constraint. More specifically, the parity encoding step 44 increases the bit length of the RLL constraint window and then reduces the maximum number of parity bits for any given data stream in the RLL constraint window to be less than the amount of increase to the RLL constraint window.

Figure 7:
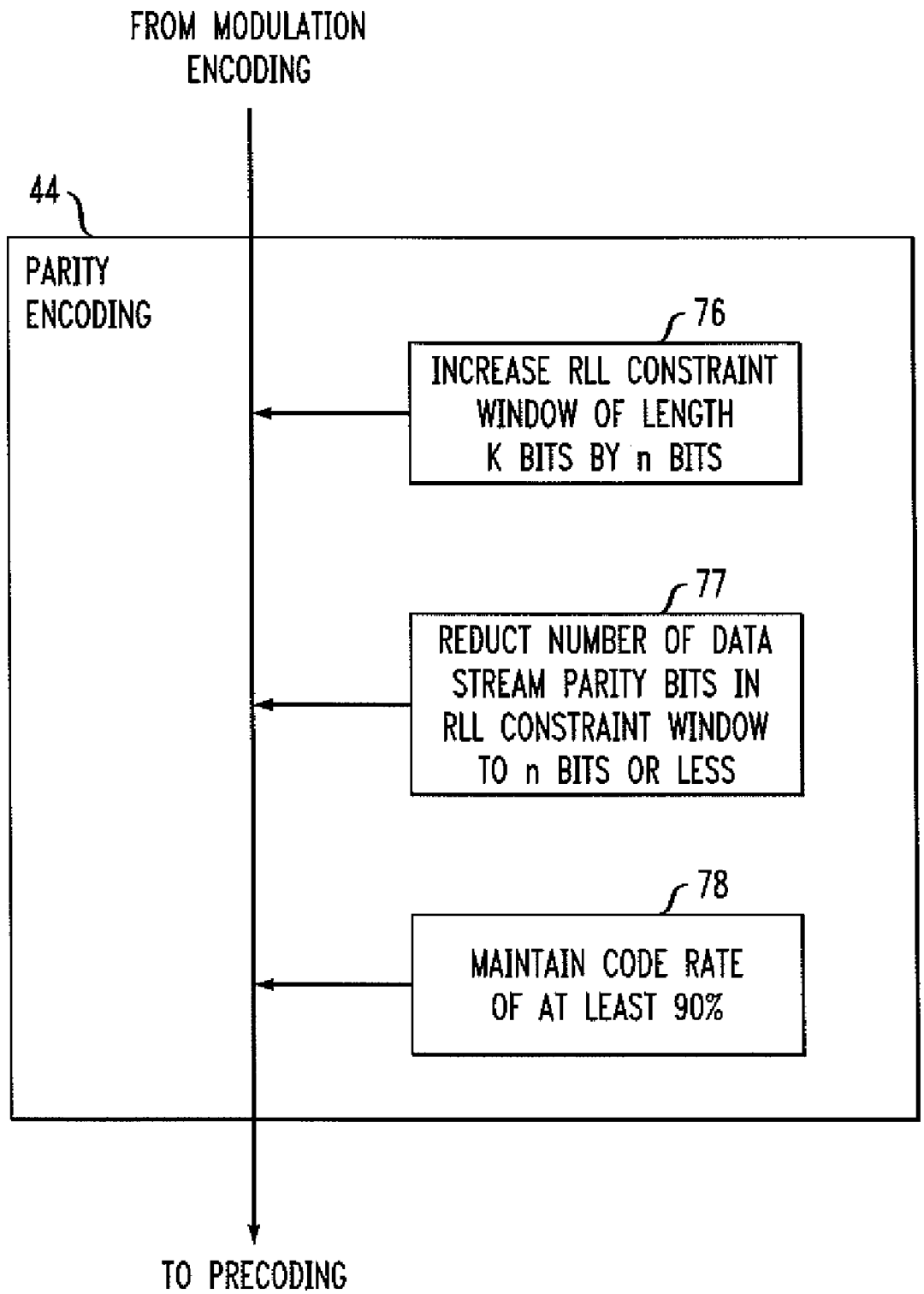
FIG. 7 is a simplified block diagram of the parity encoding step of the encoding method, according to embodiments of the invention.

Referring now to FIG. 7, shown is a simplified diagram of the parity encoding step 44 of the encoding method 40 shown in FIG. 2a. It should be understood that FIG. 7 shows only those portions of the parity encoding step 44 that relate to embodiments of the invention, to the extent that they differ from conventional portions of the parity encoding step 44. Such portions are shown generally as steps 76, 77, and 78. It also should be understood that the parity encoding step 44 according to embodiments of the invention includes other conventional portions that are not shown in FIG. 7.

Conventionally, the RLL modulation constraint has a constraint window with a bit length of k bits. As such, the RLL modulation constraint applies to any stream of data that is seen at any time by the constraint window. Conventional parity encoders, including TPC encoders, typically add n parity bits to every k bits of a given data stream. According to the inventive parity encoding step 76, the RLL constraint window of k bits is increased by n bits, with k being the number of bits of a conventional RLL constraint window and n being the number of parity bits added to every k bits of a given data stream according to conventional parity encoding steps.

Also, as part of the inventive parity encoding step, the number of parity bits in any portion of the data stream seen by the expanded RLL constraint window is kept at or below n. That is, the number of parity bits in any k+n bit portion of the data stream has n or less parity bits therein. This portion of the inventive parity encoding step is shown generally as step 77. In this manner, according to the inventive parity encoding step shown in FIG. 7, the additional steps 76 and 77 keep the parity encoder 26 from violating the RLL modulation constraint.

According to yet another embodiment of the invention, the parity encoding step 44 encodes data that has been modulation encoded by the modulation encoding step 42 in a manner that satisfies any DC modulation constraint. More specifically, the parity encoding step 44 keeps a parity code rate of at least 90%. The parity code rate is the ratio of the number of bits into the parity encoder to the number of bits out of the parity encoder. Therefore, the inventive parity encoding step keeps the number of parity bits added to the data stream to less than 10% of the total number of bits in the parity encoded data stream. Such is shown as a step 78 in FIG. 7.

According to yet another embodiment of the invention, the preceding step 46 precodes data that has been modulation encoded by the modulation encoding step 42 and parity encoded by the parity encoding step 44 in a manner that satisfies any RLL modulation constraint. In this embodiment of the invention, the RLL encoding is performed in the non-return-to-zero inverse (NRZI) domain. From there, the RLL modulation encoded data is parity encoded and then precoded. If the RLL encoding is performed in the NRZI domain, the precoding step 46 will precode the modulation encoded and parity encoded data in a manner that satisfies the RLL modulation constraint.

It will be apparent to those skilled in the art that many changes and substitutions can be made to the embodiments of the invention herein described without departing from the spirit and scope of the invention as defined by the appended claims and their full scope of equivalents.

The invention claimed is:

1. A method for encoding information to be transmitted in a digital communication or storage system, the method comprising the steps of:
   modulation encoding the information using a modulation code defined by at least one modulation constraint to generate modulation encoded information including a plurality of information bits;
   parity encoding the modulation encoded information in a manner that adds at least one parity bit to the modulation encoded information; and
   precoding the parity encoded information in such a way that the precoded encoded information does not violate the at least one modulation constraint,
   wherein the precoding step processes the first information bit after the at least one parity bit differently than the other information bits and the at least one parity bit.

2. The method as recited in claim 1, wherein the at least one modulation constraint includes a direct current (DC) constraint, and wherein the precoding step precodes the encoded information in such a way that the precoded encoded information satisfies the DC constraint.

3. The method as recited in claim 1, wherein the at least one modulation constraint includes a runlength-limited (RLL) constraint, and wherein the parity encoding step encodes the modulation encoded information in such a way that the parity encoded information satisfies the RLL constraint.

4. The method as recited in claim 3, wherein the RLL constraint has associated therewith a constraint window having a bit length k, wherein the parity encoding step increases the bit length of the constraint window by n, where n is the number of parity bits added to the portion of the modulation encoded information within the constraint window, and wherein the parity encoding step reduces the number of parity bits in the portion of the modulation encoded information to be seen by the constraint window to be less than or equal to n.

5. The method as recited in claim 1, wherein the at least one modulation constraint includes a direct current (DC) constraint, and wherein the parity encoding step encodes the modulation encoded information in such a way that the parity encoded information satisfies the DC constraint.

6. The method as recited in claim 5, wherein the parity encoding step encodes the modulation encoded information in such a way that the number of parity bits added by the parity encoding step to the number of bits in the modulation encoded information is less than 10% of the number of bits in the modulation encoded information.

7. The method as recited in claim 1, wherein the parity encoding step further comprises turbo product code (TPC) encoding the modulation encoded information.

8. The method as recited in claim 1, wherein the at least one modulation constraint includes a runlength-limited (RLL) constraint, and wherein the precoding step precodes the encoded information in such a way that the precoded information satisfies the RLL constraint.

9. The method as recited in claim 1, wherein the method comprises a method for encoding information to be stored in a data storage system, and wherein the method further comprises the step of writing the precoded information to a data storage device.

10. The method as recited in claim 1, further comprising the steps of:
    unprecoding the information precoded by the precoding step;
    parity decoding the information parity encoded by the parity encoding step; and
    modulation decoding the information modulation encoded by the modulation encoding step.

11. An apparatus for encoding information to be transmitted in a digital communication or storage system, the apparatus comprising:
    at least one modulation encoder for encoding the information, the modulation encoder using a modulation code defined by at least one modulation constraint to generate modulation encoded information including a plurality of information bits;
    a parity encoder for parity encoding the modulation encoded information in a manner that adds at least one parity bit to the modulation encoded information; and
    a precoder for precoding the parity encoded information, wherein the precoder is programmed to satisfy the at least one modulation constraint used by the modulation encoder,
    wherein the precoder processes the first information bit after the at least one parity bit differently than the other information bits and the at least one parity bit.

12. The apparatus as recited in claim 11, further comprising:
    an unprecoder for unprecoding the information precoded by the precoder;
    a parity decoder for parity decoding the information parity encoded by the parity encoder; and at least one modulation decoder for modulation decoding the information modulation encoded by the modulation encoder.

13. The apparatus as recited in claim 11, wherein the apparatus is an integrated circuit.

14. A method for encoding information to be transmitted in a digital communication or storage system, the method comprising the steps of:
- modulation encoding the information using a modulation code defined by at least one modulation constraint to generate modulation encoded information including a plurality of information bits;
- parity encoding the modulation encoded information in a manner that adds at least one parity bit to the modulation encoded information; and
- precoding the parity encoded information in such a way that the precoded encoded information does not violate the at least one modulation constraint,
- wherein the precoding step further comprises precoding the parity encoded information with a precoder, wherein the precoder includes a precoding memory state that affects the manner in which the precoder precodes information, wherein, after the parity encoding step has added the at least one parity bit to the modulation encoded information, the precoding step resets the precoder memory state whenever the precoder reads a parity bit in the parity encoded information, and wherein the precoding step precodes the parity bits and all the information bits other than the first information bit after a parity bit.

15. The method as recited in claim 14, wherein the at least one modulation constraint includes a direct current (DC) constraint, and wherein the precoding step precodes the encoded information in such a way that the precoded encoded information satisfies the DC constraint.

16. The method as recited in claim 14, wherein the at least one modulation constraint includes a runlength-limited (RLL) constraint, and wherein the parity encoding step encodes the modulation encoded information in such a way that the parity encoded information satisfies the RLL constraint.

17. The method as recited in claim 16, wherein the RLL constraint has associated therewith a constraint window having a bit length k, wherein the parity encoding step increases the bit length of the constraint window by n, where n is the number of parity bits added to the portion of the modulation encoded information within the constraint window, and wherein the parity encoding step reduces the number of parity bits in the portion of the modulation encoded information to be seen by the constraint window to be less than or equal to n.

18. The method as recited in claim 14, wherein the at least one modulation constraint includes a direct current (DC) constraint, and wherein the parity encoding step encodes the modulation encoded information in such a way that the parity encoded information satisfies the DC constraint.

19. The method as recited in claim 18, wherein the parity encoding step encodes the modulation encoded information in such a way that the number of parity bits added by the parity encoding step to the number of bits in the modulation encoded information is less than 10% of the number of bits in the modulation encoded information.

20. The method as recited in claim 14, wherein the parity encoding step further comprises turbo product code (TPC) encoding the modulation encoded information.

21. The method as recited in claim 14, wherein the at least one modulation constraint includes a runlength-limited (RLL) constraint, and wherein the precoding step precodes the encoded information in such a way that the precoded information satisfies the RLL constraint.

22. The method as recited in claim 14, wherein the method comprises a method for encoding information to be stored in a data storage system, and wherein the method further comprises the step of writing the precoded information to a data storage device.

23. The method as recited in claim 14, further comprising the steps of:
- unprecoding the information precoded by the precoding step;
- parity decoding the information parity encoded by the parity encoding step; and
- modulation decoding the information modulation encoded by the modulation encoding step.

24. An apparatus for encoding information to be transmitted in a digital communication or storage system, the apparatus comprising:
- at least one modulation encoder for encoding the information, the modulation encoder using a modulation code defined by at least one modulation constraint to generate modulation encoded information including a plurality of information bits;
- a parity encoder for parity encoding the modulation encoded information in a manner that adds at least one parity bit to the modulation encoded information; and
- a precoder for precoding the parity encoded information, wherein the precoder is programmed to satisfy the at least one modulation constraint used by the modulation encoder,
- wherein the at least one modulation constraint includes a direct current (DC) constraint, and wherein the precoder is programmed to precode the parity encoded information in such a way that the precoded information satisfies the DC constraint,
- wherein the precoder includes a precoding memory state that affects the manner in which the precoder precodes information,
- wherein, after the parity encoder has added the at least one parity bit to the information bits in the modulation encoded information, the precoder resets the precoding memory state whenever the precoder reads a parity bit in the modulation encoded information, and
- wherein the precoder precodes the parity bits and all the information bits other than the first information bit after a parity bit.

25. The apparatus as recited in claim 24, further comprising:
- an unprecoder for unprecoding the information precoded by the precoder;
- a parity decoder for parity decoding the information parity encoded by the parity encoder; and
- at least one modulation decoder for modulation decoding the information modulation encoded by the modulation encoder.

26. The apparatus as recited in claim 24, wherein the apparatus is an integrated circuit.

* * * * *